United States Patent
Bengualid et al.

(10) Patent No.: US 9,594,845 B2
(45) Date of Patent: Mar. 14, 2017

(54) AUTOMATING WEB TASKS BASED ON WEB BROWSING HISTORIES AND USER ACTIONS

(75) Inventors: Mateo Nicolas Bengualid, Cordoba (AG); Julian Ariel Cerruti, Buenos Aires (AG); Tessa Ann Lau, San Jose, CA (US); Guillermo Manzato, Capital Federal (AG); Jeffrey William Nichols, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 12/890,327

(22) Filed: Sep. 24, 2010

(65) Prior Publication Data

US 2012/0079395 A1    Mar. 29, 2012

(51) Int. Cl.
*G06F 3/00*    (2006.01)
*G06F 17/30*    (2006.01)

(52) U.S. Cl.
CPC .............. *G06F 17/30899* (2013.01)

(58) Field of Classification Search
CPC ................................ G06F 17/30899
USPC ............................ 715/714, 811, 762
See application file for complete search history.

(56) References Cited

U.S. PATENT DOCUMENTS

| | | | |
|---|---|---|---|
| 6,678,705 B1 * | 1/2004 | Berchtold et al. | |
| 6,732,142 B1 * | 5/2004 | Bates et al. | 709/203 |
| 7,757,170 B2 * | 7/2010 | Billsus et al. | 715/714 |
| 7,836,411 B2 * | 11/2010 | Plow et al. | 715/811 |
| 7,861,178 B2 * | 12/2010 | Lui et al. | 715/762 |
| 7,917,367 B2 * | 3/2011 | Di Cristo et al. | 704/270.1 |
| 7,937,340 B2 * | 5/2011 | Hurst-Hiller et al. | 706/14 |
| 7,987,426 B2 * | 7/2011 | Cotter et al. | 715/745 |
| 8,024,463 B2 * | 9/2011 | Hanson et al. | 709/224 |
| 8,073,681 B2 * | 12/2011 | Baldwin et al. | 704/9 |
| 8,200,670 B1 * | 6/2012 | Flaster et al. | 707/737 |
| 8,209,605 B2 * | 6/2012 | Poston et al. | 715/273 |
| 8,407,665 B1 * | 3/2013 | Eddings et al. | 717/106 |
| 8,555,151 B2 * | 10/2013 | Lucas et al. | 715/205 |

(Continued)

OTHER PUBLICATIONS

Banerjee et al., "Web Host Access Tool: A Support Vector Machine Approach," 2006 International Joint Conference on Neural Networks, Vancouver, BC, Canada, Jul. 2006.

(Continued)

*Primary Examiner* — William Titcomb
(74) *Attorney, Agent, or Firm* — Lieberman & Brandsdorfer, LLC

(57) ABSTRACT

Embodiments of the invention relate to the automated processing of web tasks to provide information relevant to user tasks based on past user actions and web histories. An aspect of the invention includes a system for automating the processing of web tasks in response to user requests. The system may include a transport router that receives a user task from a transport such as a short messaging system (SMS), an email system, or a telephone system. The system may further include a web task synthesizer that generates a sequence of actions to accomplish the task, typically in the form of a script for execution by a browser automation server. The script is based on past user actions, logs, and web browsing histories. The system compiles the most relevant information from the visited web pages and returns the results to the user.

25 Claims, 10 Drawing Sheets

(56) References Cited

U.S. PATENT DOCUMENTS

| | | |
|---|---|---|
| 2003/0144895 A1 | 7/2003 | Aksu et al. |
| 2004/0261026 A1* | 12/2004 | Corson .................. 715/704 |
| 2005/0108200 A1 | 5/2005 | Meik et al. |
| 2005/0160107 A1 | 7/2005 | Liang |
| 2005/0278728 A1* | 12/2005 | Klementiev ............ 719/328 |
| 2006/0194572 A1 | 8/2006 | Fresonke et al. |
| 2007/0016476 A1 | 1/2007 | Hoffberg et al. |
| 2007/0050191 A1 | 3/2007 | Weider et al. |
| 2007/0214133 A1* | 9/2007 | Liberty et al. ............ 707/5 |
| 2007/0219978 A1 | 9/2007 | Myers |
| 2008/0005685 A1* | 1/2008 | Drews et al. ............ 715/764 |
| 2008/0082629 A1* | 4/2008 | Puthiyaveettil .......... 709/217 |
| 2009/0286514 A1 | 11/2009 | Lichorowic et al. |

OTHER PUBLICATIONS

Montano et al., "Agent Learning in Multi-Agent Contracting Systems (MACS)," Decision Support Systems, No. 45, pp. 140-149, 2008.

* cited by examiner

AUTOMATING WEB TASKS BASED ON WEB BROWSING HISTORIES AND USER ACTIONS

BACKGROUND

Embodiments of the invention relate generally to World Wide Web applications, and more particularly, to automating the processing of web tasks in response to user requests.

Mobile applications generally use the World Wide Web (web) to allow users to quickly look up information, download small amounts of data, or to access private computer systems during short interactions while away from the office or home. In a typical use scenario, the user may access a web site or a private server with a mobile telephone or a hand-held computer device that has limited web browsing capabilities. For example, these mobile devices may have small display screens, simplified keypads, limited network bandwidth, or minimum graphics support. User requests for web tasks from such devices are generally in the form of short and specific commands. For example, a user may send short text messages to find out road conditions for a particular highway from a weather web site, retrieve operating hours and address of a local business, or forward office phone calls to a voice mail system.

Web applications often require a user to download the entire content of related web pages to find the desired information. For example, the address of the business that the user is interested in may appear on one web page while the business' operating hours may be on a different web page. The user would need to download both of these web pages in order to find the business address and operating hours information. In addition, a user may need to access a sequence of web pages to reach a web page that contains the information of interest.

Today's web pages include substantial graphic contents, which may take a significant amount of time to download to a remote portable device due to the device's limited resources and network overheads. In many common use scenarios, the graphic contents and large amount of downloaded data may not be needed by the user or be suitable for mobile applications running on devices with resource constraints. In addition, they generate unnecessary network traffic and additional system workloads.

BRIEF SUMMARY

Exemplary embodiments of the invention relate to automating the processing of user web requests based on past user actions and web browsing histories. The exemplary embodiments of the invention may be used for portable user devices with limited web browsing resources, among other applications.

One aspect of the invention comprises a system for automating a user task on the web. The system may comprise a transport router for receiving the user task request from a transport such as a short messaging system (SMS), an email system, or a computer communications system. The system may further comprise a web task synthesizer for synthesizing a sequence of web actions to accomplish the task wherein the sequence of actions is based on previous user web actions. The system may further comprise a browser automation server for executing the synthesized sequence of actions on the web and returning to the user information relevant to the task. This information is extracted from the web pages downloaded during the execution of the web action sequence.

Another aspect of the invention comprises a method for automating a user task on the web. The method may comprise synthesizing a sequence of actions to accomplish the user task, wherein the sequence of actions is based on previous user web actions and scripts. The method may further comprise executing the synthesized sequence of actions on the web. The method may further comprise returning to the user information relevant to the user task that resulted from the execution of the web action sequence.

Another aspect of the invention includes a computer program product for automating a user task on the web. The computer program product comprises a computer readable storage medium having computer readable program code embodied therewith. The computer program product may comprise computer readable program code configured to synthesize a sequence of actions to accomplish the task wherein the sequence of actions is based on previous user web actions and scripts. The computer program product may further comprise computer readable program code configured to execute the synthesized sequence of actions on the web. The computer program product may further comprise computer readable program code configured to return to the user information relevant to the user task that resulted from the execution of the web action sequence.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

The invention relates to automatically synthesizing task actions and corresponding scripts for execution on the web in response to user requests based on web browsing histories and user activity logs.

Figure 1:
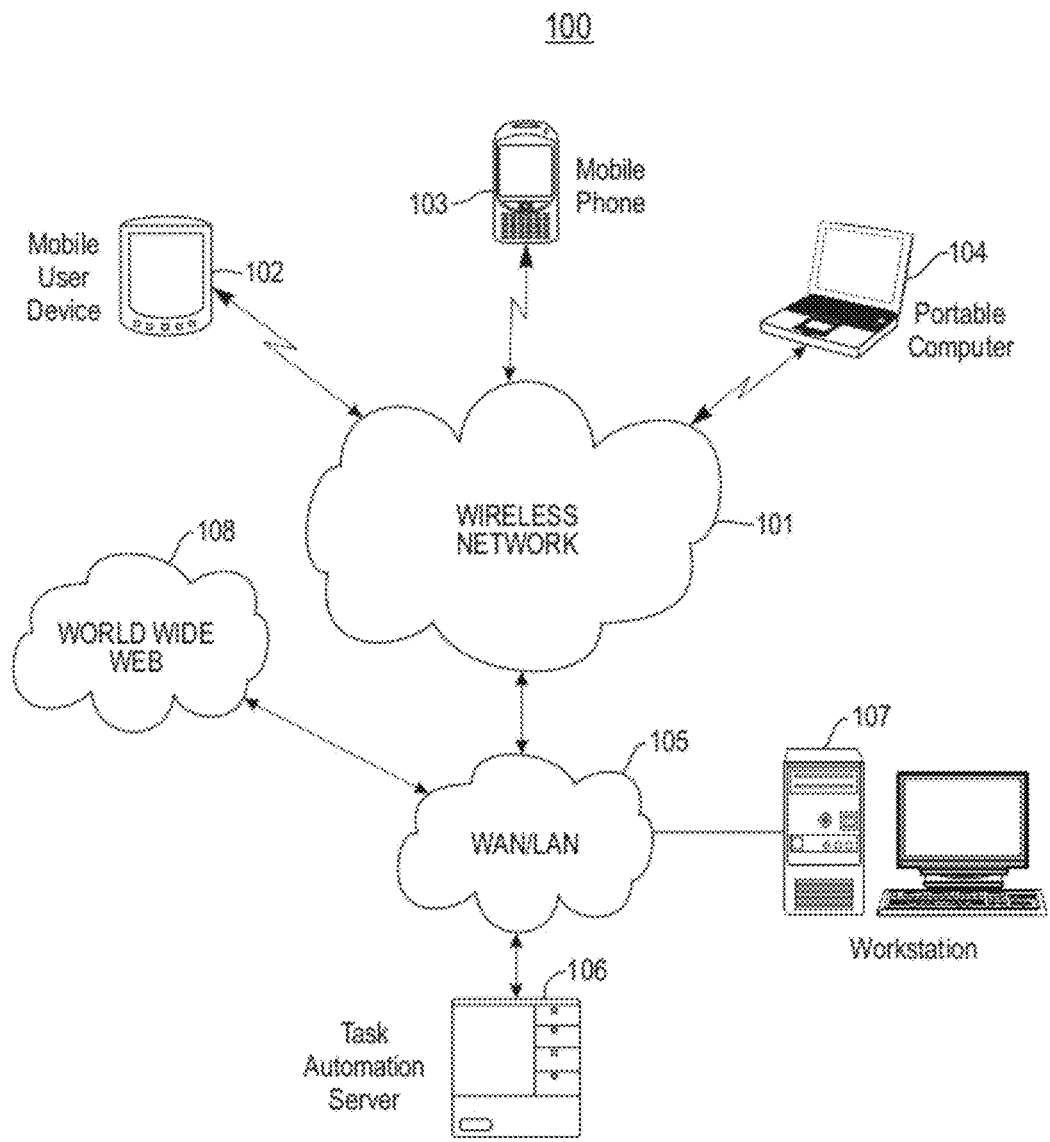
FIG. 1 illustrates an exemplary block diagram of a network environment in which the automation and processing of user tasks may be provided, according to embodiments of the invention.

Referring now to the drawings and in particular to FIG. 1, there is illustrated an exemplary block diagram of a network environment in which the automation and processing of user tasks may be provided, according to embodiments of the invention. The illustrated network environment 100 includes a wireless network 101 through which a mobile user device 102, mobile phone 103, or a portable computer 104 may access other connected private or public networks. Wireless network 101 may be based on radio communications such as WiFi, WiMAX, or other network technologies. Mobile user device 102 may be a hand-held pad computer or other mobile communication devices with messaging capability.

Wireless network 101 may be connected to a private or third-party wide area network (WAN) or a local area network (LAN) 105. Access to WAN/LAN 105 generally requires authentication to and authorization by the network owner. In the case where WAN/LAN 105 is a private network, a user may use mobile device 102, mobile phone 103, or computer 104 to access a private server 106 and communicate with other computers in the private network, such as computer 107, through the private WAN/LAN 105. Further, a private WAN/LAN 105 may be connected to the World Wide Web 108 through appropriate firewall protection.

Figure 2:
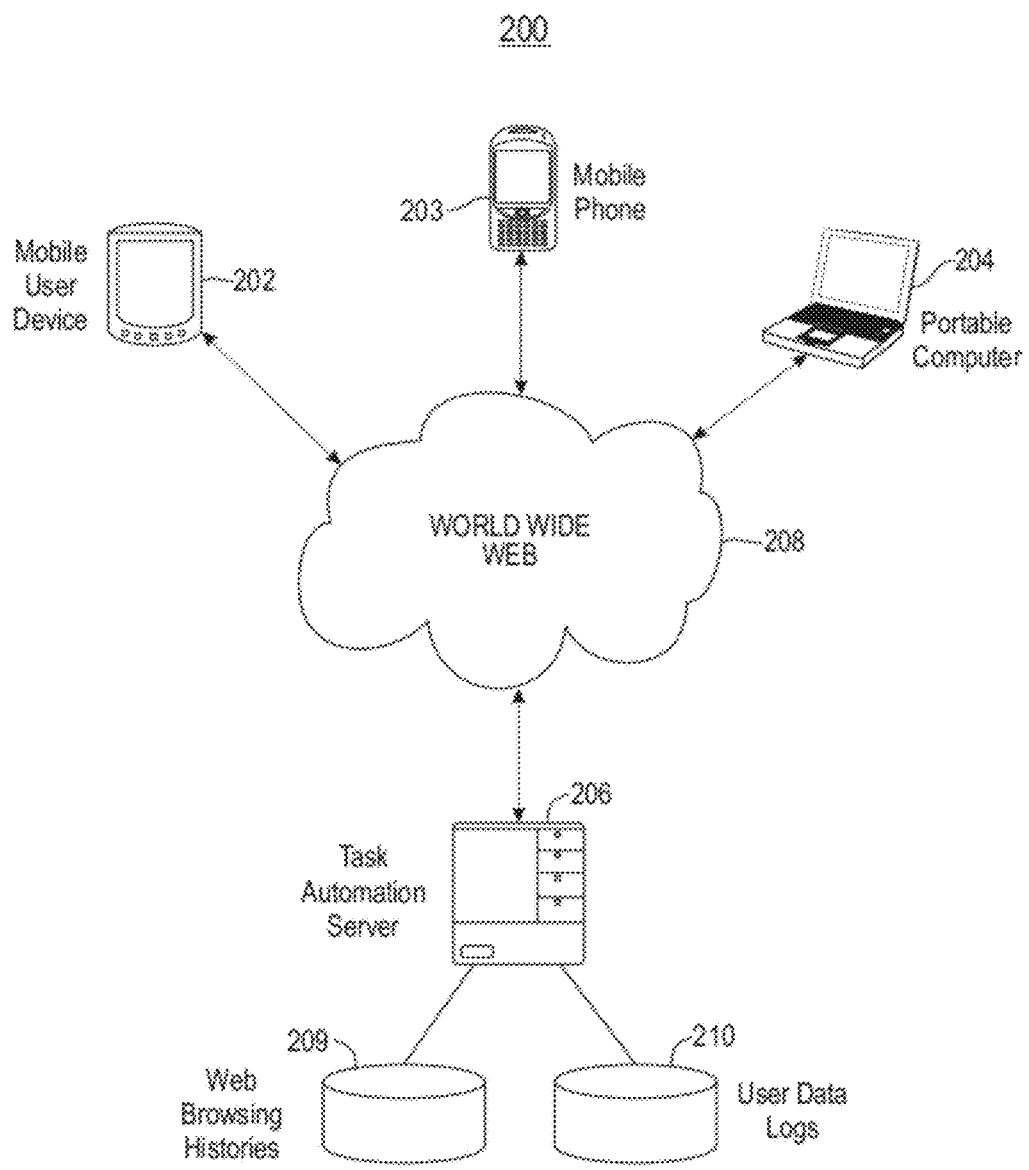
FIG. 2 illustrates an exemplary block diagram of a World Wide Web environment for automating and processing of user tasks, according to an embodiment of the invention.

FIG. 2 illustrates an exemplary block diagram of a World Wide Web environment for automating and processing of user tasks, according to an embodiment of the invention. In the illustrated web environment 200, user devices 202-204 may access the World Wide Web 208 through a wired or wireless network. World Wide Web 208 represents public and private computer networks that are interconnected to allow access, typically with appropriate security protection mechanisms. Task automation server 206 may be a public or private server with connection to the World Wide Web 208 to allow user devices 202-204 to send user tasks to the task automation sever 206 for processing. Task automation server 206 may have access to user web browsing histories 209 and user data logs 210.

Figure 3:
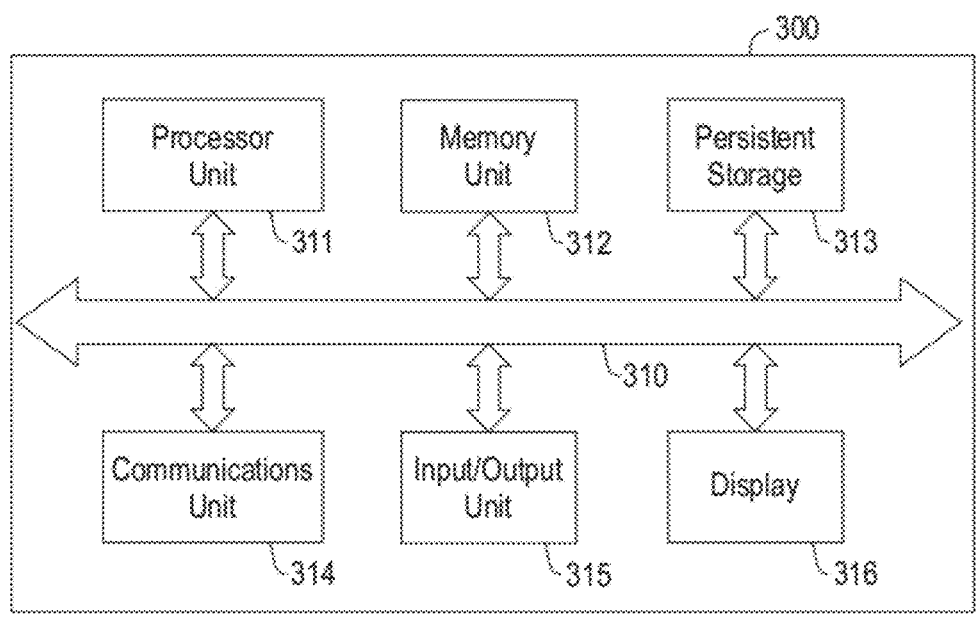
FIG. 3 illustrates an exemplary block diagram of a representative computer which may be part of a device from which a user may request a web task, according to an embodiment of the invention.

FIG. 3 illustrates an exemplary block diagram of a representative computer which may be part of a device 102-104 from which a user may request a web task, according to an embodiment of the invention. Data processing system 300 includes a processor unit 311, a memory unit 312, a persistent storage 313, a communications unit 314, an input/output unit 315, a display 316 and a system bus 310. Computer programs are typically stored in persistent storage 313 until they are needed for execution by an operating system, at which time the programs are brought into the memory unit 312 so that they can be directly accessed by the processor unit 311. The processor unit 311 selects a part of memory unit 312 to read and/or write by using an address that the processor 311 gives to memory 312 along with a request to read and/or write. Usually, the reading and interpretation of an encoded instruction at an address causes the processor 311 to fetch a subsequent instruction, either at a subsequent address or some other address. The processor unit 311, memory unit 312, persistent storage 313, communications unit 314, input/output unit 315, and display 316 interface with each other through the system bus 310.

Figure 4:
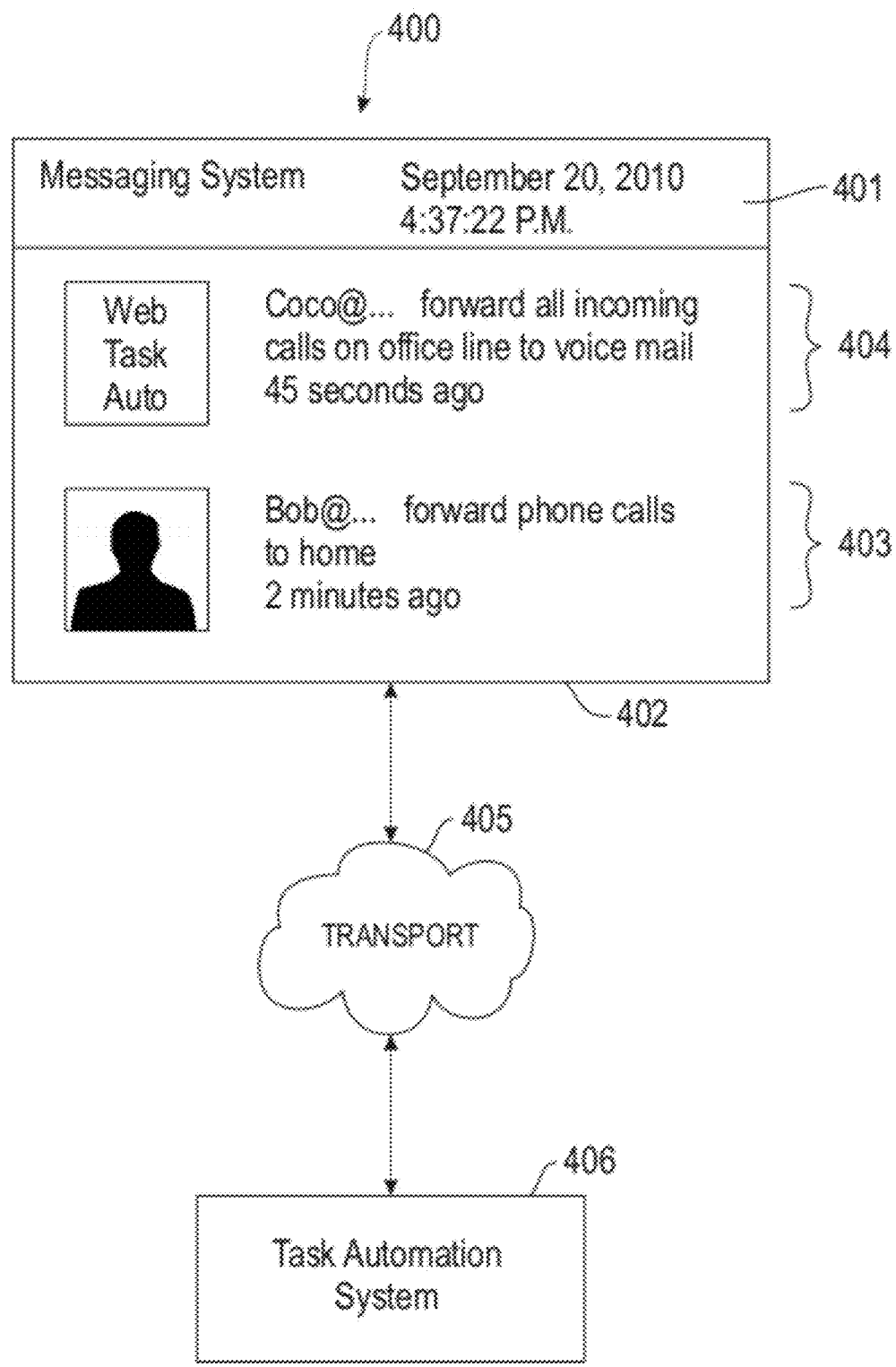
FIG. 4 illustrates an exemplary messaging system interface through which a user may request a web task to a task automation system, according to an embodiment of the invention.

FIG. 4 illustrates an exemplary message system interface through which a user may request a web task from a user device to a task automation system. In one embodiment, message system interface 400 operates on a user device 102-104 for communicating with a task automation system 406 through a transport system 405. The transport system 405 may be a short messaging system (SMS), an email system, a computer system, or a telephone system. As an example, the message system interface 400 may comprise an identification field 401 that displays the name of the messaging system, and the current date and time of the communication session in which the messages are being exchanged between the user and task automation system 406. A window area 402 of the message interface 400 displays outgoing messages 403 sent by the user to a web automation system 406 and incoming messages 404 returned to the user by the task automation system 406.

As an example of the user interaction with the task automation system 406, the user may send a command in an outgoing message 403 to the task automation system 406 to instruct it to forward all incoming phone calls on her office phone to her home phone. The user's workplace uses a VOIP-based phone system that allows the forwarding of phone calls to another telephone number through a web application. The user performs this forwarding task so frequently that she has created a script to automate the task. While being away from the office, the user could send a message like "forward phone calls to home" to the web task automation system 406.

The task automation system 406 would search through the user's recently used scripts, using the user's message as a query, and find a phone forwarding script. In examining the user's logs and accessible web browsing histories, the web automation system 406 may determine that the best matching activity in response to the user's request is a script that the user has previously created for forwarding incoming office calls to the user's voice mail. The task automation system 406 identifies this phone-forwarding script, executes it on a web server, and responds to the user that the script has completed successfully, as shown by the incoming message 404.

Figure 5:
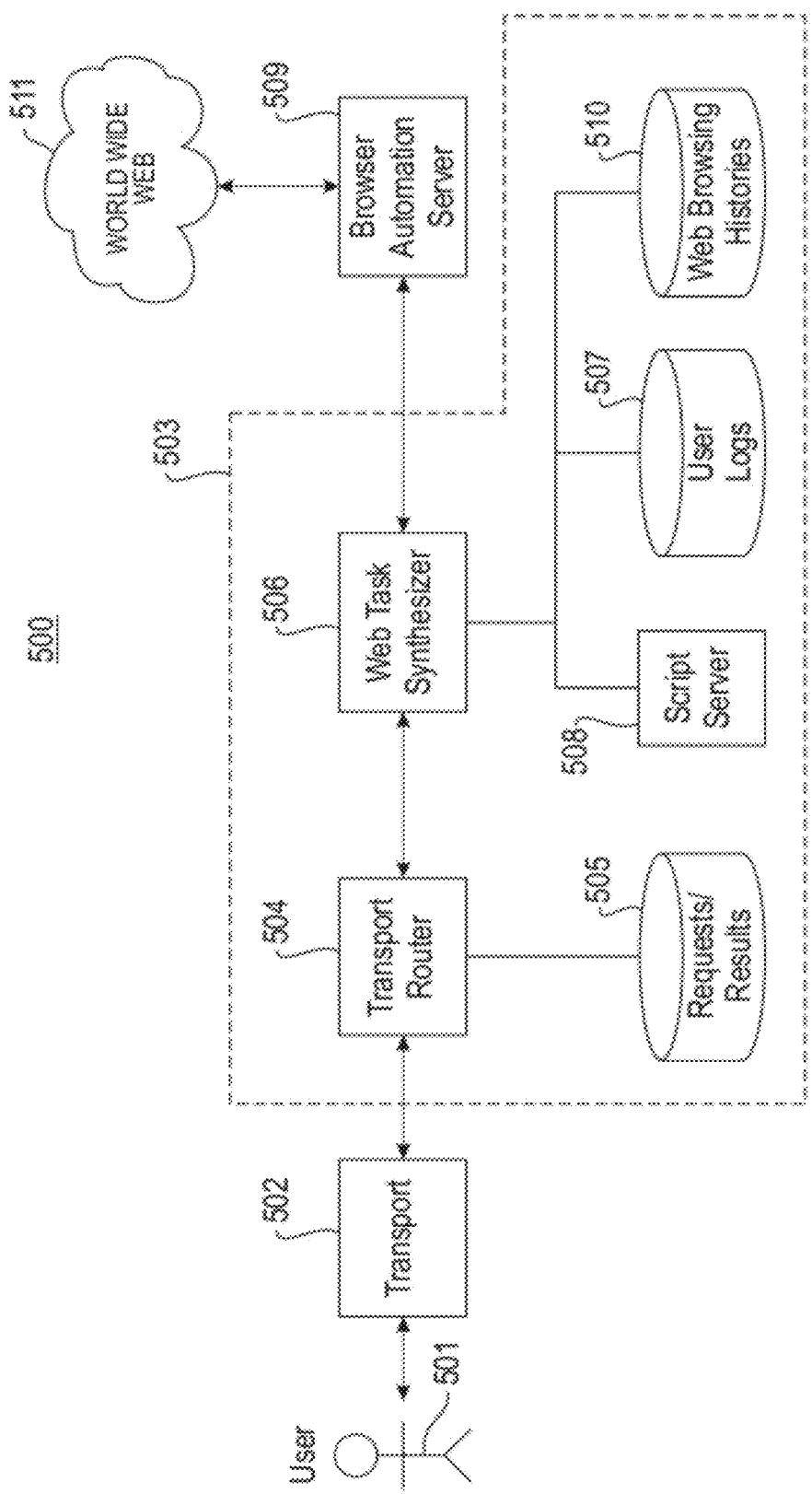
FIG. 5 is an exemplary block diagram of a system for automating and processing a web task request, according to an embodiment of the invention.

FIG. 5 illustrates an exemplary block diagram of a system for automating and processing a web task request, according to an embodiment of the invention. Web task automation system 503 may be coupled to a transport 502 through which a user 501 can send requests of web tasks to be performed, typically in the form of short commands, to task automation system 503 for processing. Transport 502 may be an input channel such as a short messaging system (SMS), an email system, or a telephone-computer system that user mobile devices 102-104 can communicate with, send messages to, and receive messages from the task automation system 503.

The task automation system 503 may comprise a transport router 504 for receiving, pre-processing and routing a user task request to a web task synthesizer 506. The web task synthesizer 506 determines an appropriate sequence of actions to accomplish the task and synthesizes a corresponding script to be executed on the web. One of the tasks that the transport router 504 may perform is to parse a user request to extract any user parameters, leaving a core command to be processed further by the web task automation system 503.

Web task synthesizer 506 is a planning component that examines the core user command to identify one of more sequences of web actions that could satisfy the core command. In one embodiment of the invention, the task synthesizer 506 may include a natural language interface capable of processing user commands in natural language, for example, the user command "forward phone calls to home".

The task automation system 503 may further include a script server 508 for storing previously created or executed web scripts for performing identified sequences of web actions. The previously generated or executed web scripts, or user actions, may come from context repositories that the web task and script synthesizer 506 has access to. Examples of the context repositories include web browsing histories 510 and user activity logs 507. In order to identify a desired script from existing logs and histories, the script server 508 may search the context repositories 507 and 510 with the user command as a query. This search may include the scripts created or executed by the current user as well as by other users that are relevant to the task requested by the current user.

The web task synthesizer 506 may add user parameters to the synthesized web script as specified in the user request. Details on adding parameters to a synthesized script are described with reference to FIG. 7. Once the web task synthesizer 506 generates a script for the requested task, it forwards the script to a browser automation server 509 that will execute the script on the web 511. Browser automation server 509 typically runs the script in a headless web browser.

A clipping module, which may be part of or coupled to the browser automation server 509, extracts portions of the web pages visited (i.e., downloaded) while the browser automation server 509 executes the synthesized script to construct a meaningful response for the user. The extracted web page portions include information that is most relevant to the task requested by the user as determined by the browser automation server 509. Details on the identification of relevant information from the visited web pages are described below with reference to FIG. 8. Transport router 504 then returns the task response to the user via the original transport 502 or an alternate transport as requested by the user. In addition, the user's task request and system response may be saved in an interaction database 505 for use in processing future task requests to avoid synthesizing and executing the same script again on the web.

Figure 6:
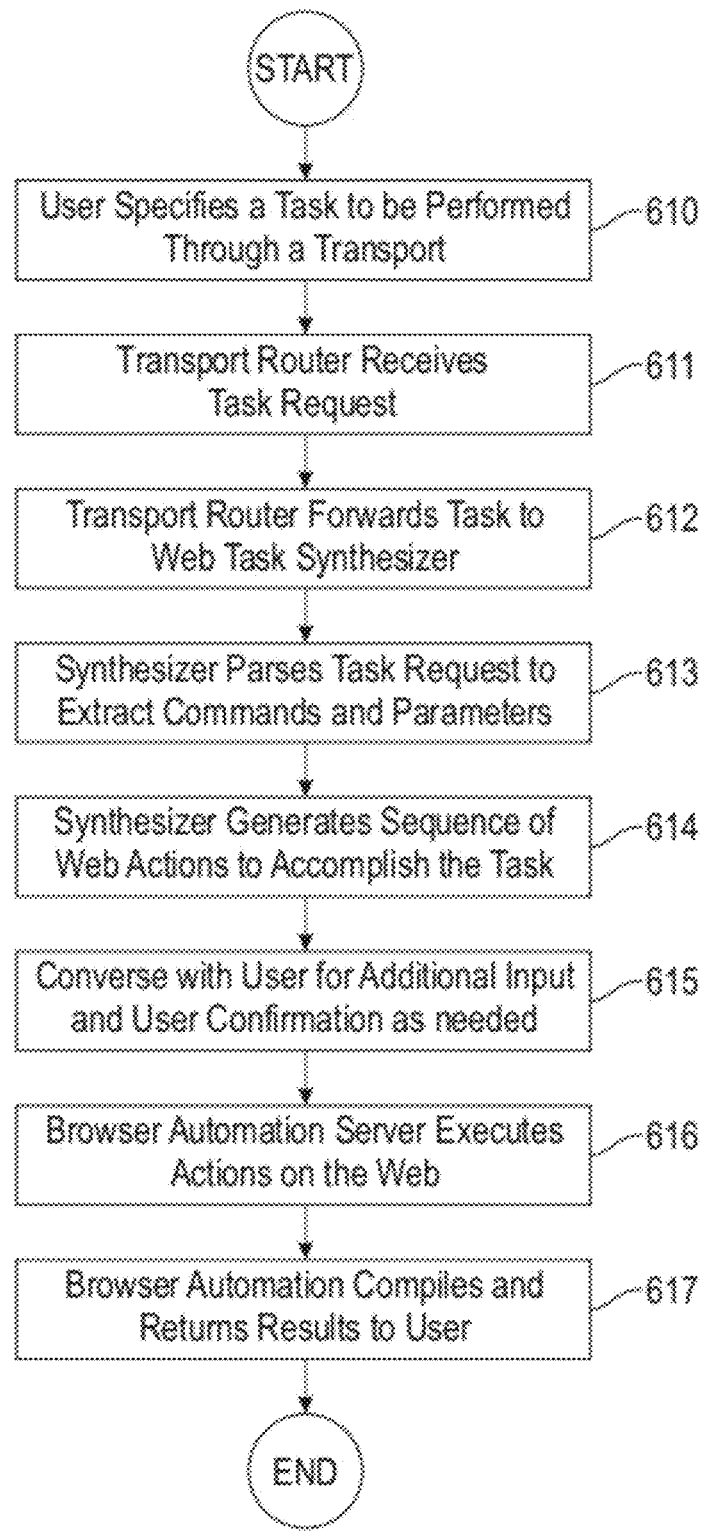
FIG. 6 is a flow chart of an exemplary process for automating and processing a web task request, according to an embodiment of the invention.

FIG. 6 is a flow chart of an exemplary process for automating and processing a web task request, according to an embodiment of the invention. The process begins at step 610 with a user specifying a task to be performed through a transport 502 such as a short messaging system (SMS) interface, an email interface, or a computer-communication interface. The transport router 504 of the task automation system 503 receives a task request, at step 611, and forwards the request to the web task synthesizer 506 of the system at step 612. The web task synthesizer 506 parses the request to extract user instructions and relevant parameters at step 613. It may further synthesize a sequence of web actions to accomplish the task based on previous user actions and web browsing histories, at step 614. The synthesized sequence of actions may be in the form of a script (a web language) to be executed on the web, such as ClearScript. Details on an exemplary process for synthesizing a script are described with reference to FIG. 8.

For some user requests, the task automation system 503 may need additional input from the user in order to correctly synthesize the required sequence of web actions, to select the best choices among a group of scripts relating to the user task, or to confirm a synthesized script. In these situations, the task automation system 503 may further converse with the user through a user interface, at step 615. The web task synthesizer 506 may then forward the synthesized script for the identified actions to the browser automation server 509 for execution on the web, at step 616.

During the script execution, a web browser running on the browser automation server 509 may visit (i.e., download) one or more web pages that have information relevant to the requested user task. The browser automation server 509 compiles relevant portions of the visited web pages, for example, in the form of clippings, and returns the consolidated clippings to the user via the original transport, at step 617. Alternatively, the user may specify a different transport through which the task automation system 503 could return the web task results. Details on the generation of the web task results are described below with reference to FIGS. 8 and 9.

Web Action Synthesis

Figure 7:
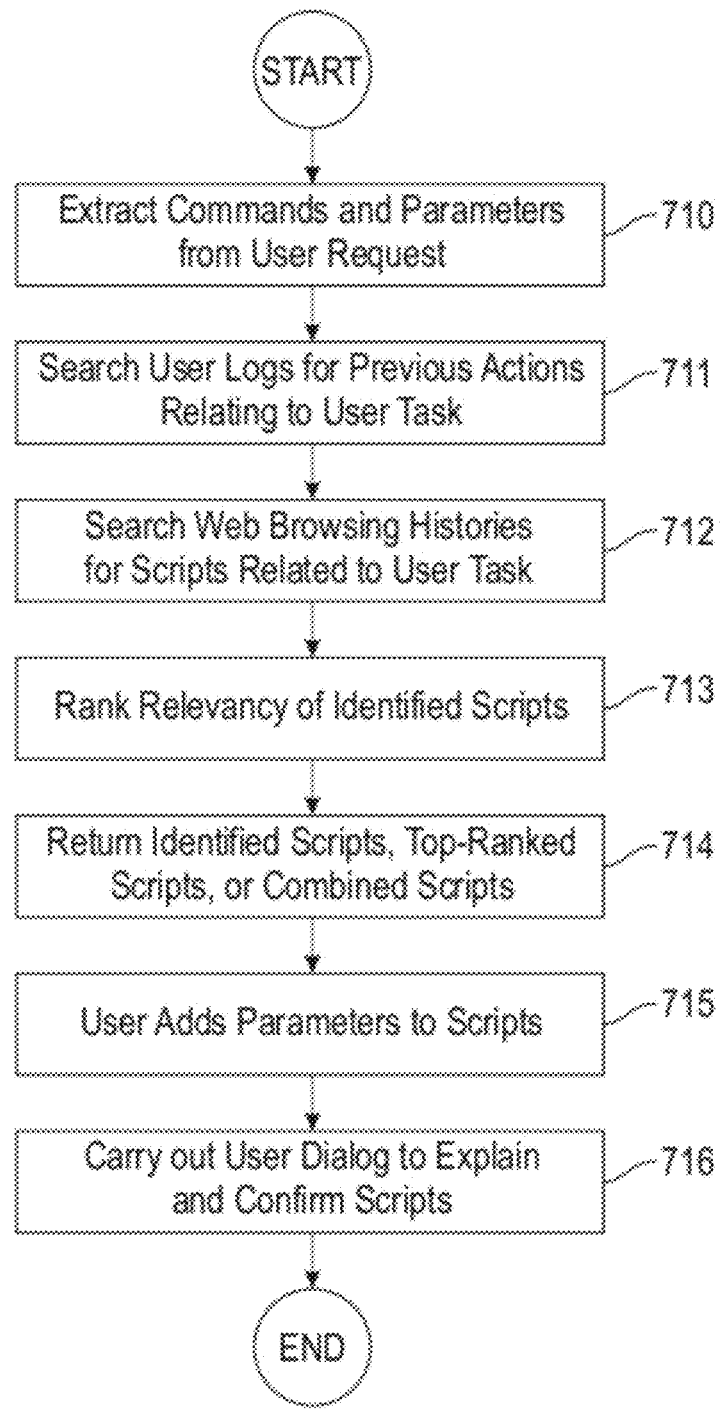
FIG. 7 is a flow chart of an exemplary process for extracting user instructions and parameters from a user request and synthesizing a sequence of web actions to be executed in response to the user request, according to an embodiment of the invention.

FIG. 7 is a flow chart of an exemplary process for extracting user instructions and parameters from a user request and synthesizing a sequence of web actions to be executed in response to the user request, according to an embodiment of the invention. At step 710, the web task synthesizer 506 examines the user request to identify user commands and any applicable parameters. Tasks to be performed on the web often require custom data values to be provided at runtime. For example, a task may be for retrieving road conditions on a particular highway, the name of a product to be searched, or the title of a software defect to be reported. To enable users to supply parameters in their command, the task automation system 503 may include a parser for extracting certain types of information from a user command and use this information to search for an appropriate script for execution on the web. There are several possible approaches to parsing.

In one embodiment, the task automation system 503 may require the user to follow a defined syntax for specifying parameters and how they are used in the command. This approach requires the user to remember the syntax and may be difficult for a novice or casual user. In another embodiment, the task automation system 503 may treat user input as unstructured text with no syntax requirements. Although this would avoid an enforced syntax, it is less expressive as the user cannot explicitly specify certain words as parameter values. Alternatively, the task automation system 503 could apply natural language processing to a user command to semantically interpret the words in the command.

In still another embodiment, the task automation system 503 may use a hybrid approach between strict syntax and unstructured text by scanning for specific keyword based statements, and treating the remainder as unstructured text. Such an embodiment preserves some of the ease-of-use of the unstructured approach, while providing the ability for users to express certain types of structured information in a natural way. The task automation system 503 may assume that a command could contain up to three types of information: the task to be performed, parameters used to perform the task, and where to send the output. The specification of what task to perform generally consists of free form text on the core command. Parameter and output specification may be expressed using a commonly understood syntax. For example, the following commands show how parameters might be naturally specified using keywords such as "for" and "using", while output modalities might use the word "via":

check the library for book "ABC".
    get highway conditions for highway 88 via email.
    log a bug, using Parser crash on line 45 as the title.

Using the disclosed hybrid approach, the present embodiment parses these commands as follows:

core command (check the library), parameters (book=ABC).
    core command (get highway conditions), parameters (highway=88), output (email).
    core command (log a bug), parameters (title=Parser crash on line 45).

The benefit of the hybrid approach is that if the user fails to specify parameters using the correct syntax, then the entire input will be treated as a core command, which allows the system to fail gracefully rather than report a syntax error. However, even with the hybrid approach, users may not always clearly differentiate between the name and value of a parameter. To reduce the burden on the user of specifying which words are the parameter name and which are the value, the present embodiment may use a non-deterministic parameter recognition which considers all possible combinations of parameter names and values. For example, if the command is "get the phone number for full name marc jones", then the web task synthesizer 506 may generate the following potential name/value pairs:

full=name marc jones
    full name=marc jone
    full name marc=jones

Even though only one of these interpretations is correct, all are passed to the next stage of processing. Only the correctly named parameter will be required for script execution. Incorrect parameters will be discarded because their names are not referenced in a script. An example of some grammars for implementing the parsing of user commands is shown in Table 1.

TABLE 1 command ::= {please}, command_core, {","} param_list , {","} , transport
command_core ::= word , {word}
param_list ::= "using" , value , "as" , var | "for" , var , value | "with" , value ,
"as" , var
transport ::= "via" , (sms | web | twitter | email)

Still referring to FIG. 7, at step 711, the web task synthesizer 506 searches user log repositories 507 for previous user actions and scripts relating to the requested task. Such repositories may include user-defined scripts for previous tasks, telephone logs, and other forms of user communications. To allow the web task synthesizer 506 to search the logs of previous user actions and scripts, the user may need to grant the task automation system 503 permission to access these logs or upload them to a server that the task automation system 503 may access.

The web task synthesizer 506 may further search available web browsing histories 510 of the current user and other users to identify a related script for the requested task in step 712. These histories are in a database that the task automation system 500 has access to. The search of the web browsing histories 510 may employ a vector-space model, which treats script titles and script text as "bags of words" and uses a score to rank the relevance of a script relative to the user task, per step 713. The search may return the best matching script, a number of top-ranked scripts for the user to select from, or a script derived from the top-ranked scripts.

In another embodiment of the invention, the task automation system 503 may interact with a script mining component (not shown) for mining a desired script from web history logs. The script mining component may be based on any known text mining process. A web history log typically captures an undifferentiated stream of user actions that are not segmented by task or web site. As a result, a search function that returns individual steps in response to a query and requires the user to select the next actions, e.g., "go to mylibrary.com", would not provide the task automation system 503 with the required script. For example, the task of searching for a book at a library might involve first clicking on a "library catalog" link, followed by selecting "books" from a drop-down menu, then clicking a "search" button. No single step contains all the words in the query; instead, the resulting script should retrieve a group of related steps in response to the query when executed.

The script mining component may perform a segmentation of the history stream in order to group web actions into segments that could be used as a plan for compiling the required script. Each segment is associated with a task.

Logically, a segment is defined as a group of steps S1, S2 . . . Sn such that t(Si+1)−t(Si)<theta, where t(Si) denotes the timestamp of step Si and theta is an arbitrary threshold. As an example, a threshold of 5 minutes has been found to be a reasonable tradeoff between making segments too inclusive and splitting segments into too many pieces. In practice, users often move from one task to the next without waiting several minutes between tasks. This task switching is typically accompanied by going to a different website in order to start the new task. In one embodiment, in addition to segmenting based on time, the task automation system 503 may segment the steps based on changes of web locations. If the user enters a new URL into the location bar, or clicks a bookmark, or otherwise triggers going to a different location, then the task automation system 503 may insert a segment boundary right before that step.

Once a user's web logs have been segmented, the web task synthesizer 506 may use a vector-space model and a ranking scheme to rank these segments relative to the user's original query, at step 713. The web task synthesizer 506 merges the resulting hits with the results of the script search to form a single ranked list of possible script results. It returns the top script from the ranked list as an output of the synthesis process, at step 714. Alternatively, the task automation system 503 may return a set of scripts with the highest similarity scores from the ranked list and prompt the user to select a script from the set. Still another embodiment is to combine the top-ranked scripts into a best-practice script and return the combined script to the browser automation server 509 for execution.

User Task Parameters

The web task automation system 503 may provide an option for a user to add parameters to a script in step 715, for example, in the form of a prompt like "enter your highway into the "Road conditions" textbox". At runtime, the task automation system 503 may retrieve from the user's databases a variable named "highway" and a short list of name/value pairs that user can create to customize script execution. The task automation system 503 may use a similar mechanism to allow the user to customize the execution of a script at runtime. In one embodiment, when a script retrieved from a script repository contains variable references, the system may use the following three sources to supply the parameter value:
- Parameters specified in the command.
- Recently-used parameters from a previous interaction.
- Parameters from the user's database.

In this embodiment, parameters provided in the command override all other sources of parameters. If the value is not supplied in the command, the task automation system 503 may retrieve previous values used in prior interactions. For example, if a user wanted to retrieve the same highway information a second time, the system could use the "highway" parameter from the user's last interaction. The user can optionally grant access to a user database. If the parameter cannot be found in either the command or in recent history, then the system can retrieve the value from the user database. If the variable cannot be found in any of these sources, then the system may return a message to the user requesting the user to supply the missing value. The user may then repeat the command, including the missing information.

Conversing with the User

To ensure that the task automation system 503 performs a requested task as intended by the user, the system 503 may provide a dialog module to allow the system to interact with the user and obtain user's confirmation of a synthesized script, especially in case of a first-time user, at step 716. When the system receives a command to run a script that has not been previously executed for that user, the system may explain what it is about to do, and ask the user to confirm the script that it has identified. The following exchange illustrates an example of such a dialog.

User: Forward my phone
Automation system: Run script "Forward phone calls to home, go to callmgr.corp.com, click the "Forward all calls" link, . . . ?"
User: yes The task automation system may then respond with the identified the script. The next time this user asks the system to forward her phone calls, the system remembers that it has previously executed this script for the user, so the confirmation step can be skipped. This memory is based on the steps of the script to be executed and not on the command the user supplied. For example, if the user next asks the task automation system to "update phone forwarding", and it retrieves the same script using different query words, the system would still remember that this is a script the user had previously approved, and run it without confirmation. Through conversation, the task automation system can learn from interacting with the user, and remember what it has done for the user in the past, while enhancing user trust in the system. This allows future tasks to be done quickly without the overhead of further confirmation.

Response Generation

Figure 8:
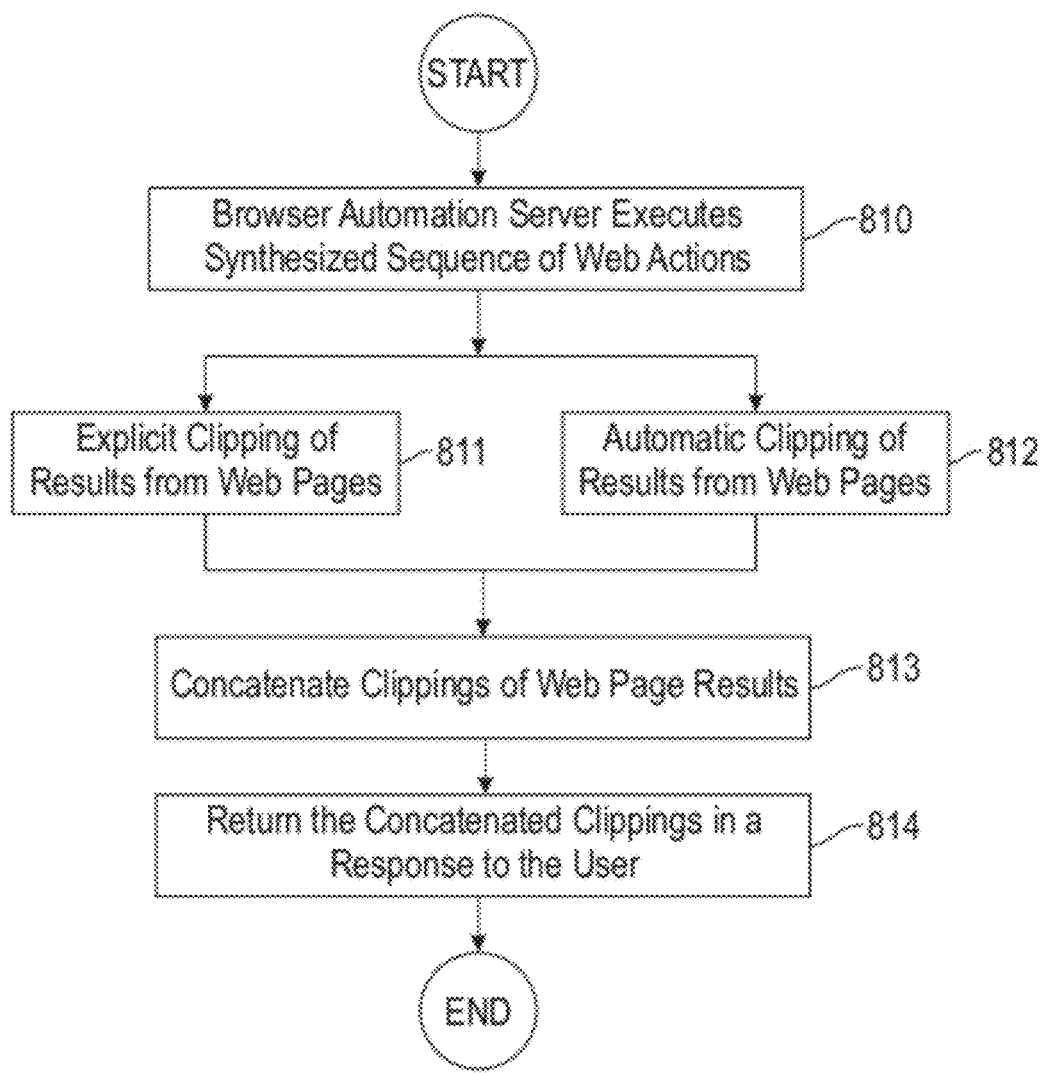
FIG. 8 is a flow chart of an exemplary process for executing a synthesized sequence of web actions, generating a response to a user task request, and returning the response to the user, according to an embodiment of the invention.

FIG. 8 is a flowchart of an exemplary process for executing a synthesized sequence of web actions, generating a response to a user task request, and returning the response to the user, according to an embodiment of the invention. User tasks often involve fetching certain information from the web and returning the information to the user. At step 810, the browser automation server 509 executes the synthesized script on the web, typically in a headless web browser. The script execution for the identified actions may results in multiple web pages being downloaded to the server that include information relevant to the user task. To provide a concise response to the user, the browser automation server 509 may combine several parts of the web pages into the response.

In an exemplary embodiment, the browser automation server 509 may provide two mechanisms for clipping relevant portions of the web pages: explicit clipping and auto-clipping, as respectively shown by steps 811 and 812. In explicit clipping (step 811), the synthesized script includes explicit clip commands that instruct the browser automation server 509 to extract regions of particular interest from the web pages. The result is a concatenation of the outputs of the clip commands within the script, per step 813. For example, in response to the user request for the address and operating hours of a local library, the synthesized script may be as follows:
- go to http://library.org/about/locations/localbranch/index.htm
- clip the element that contains "Branch Library"
- clip the element that contains "Regular Hours:"

Figure 9:
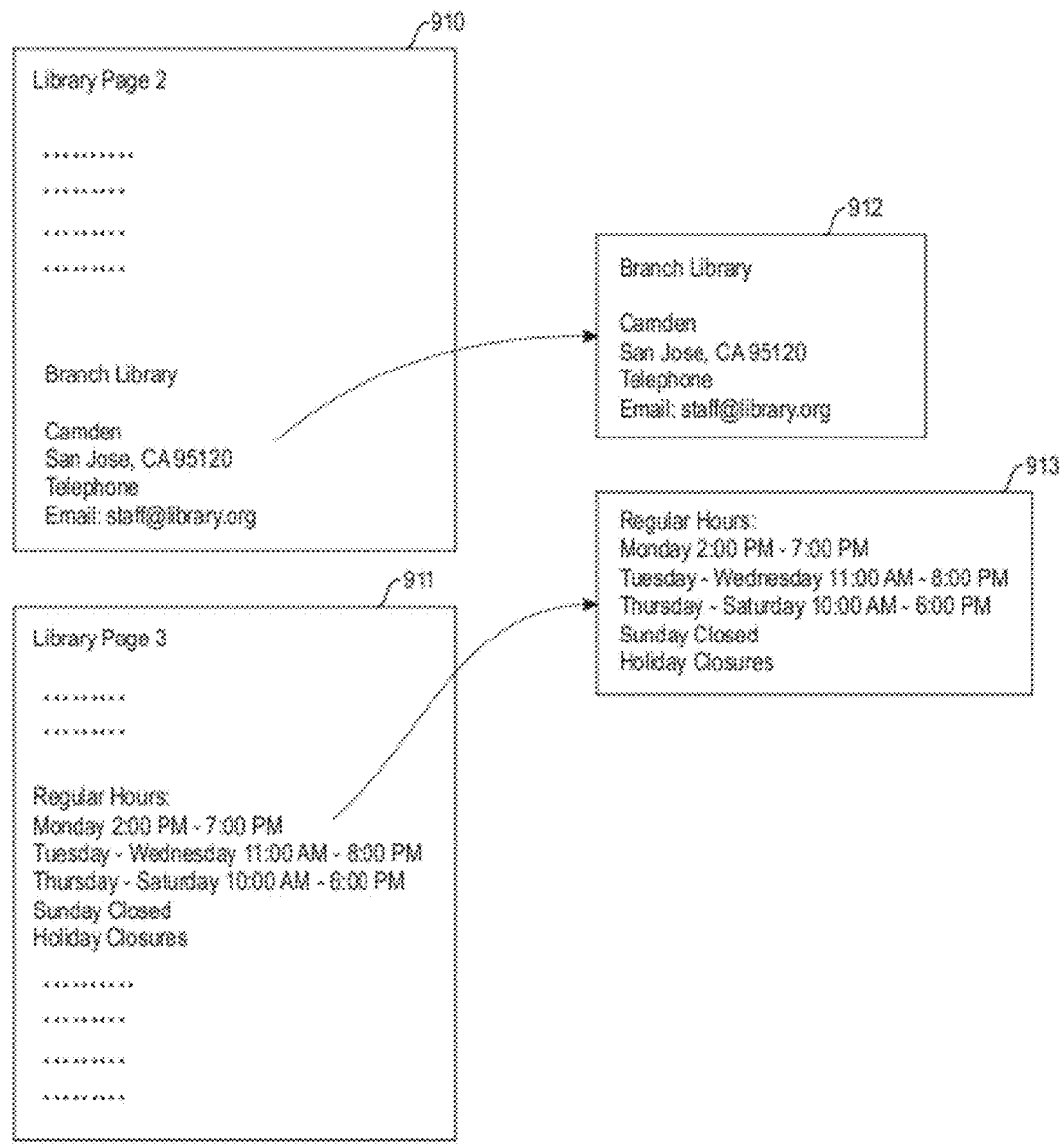
FIG. 9 illustrates an example concatenation of relevant information extracted from web pages resulting from the execution of a synthesized sequence of web actions in response to a user request, according to an embodiment of the invention.

The execution of the above script retrieves the address and operating hours of a local library which may appear in two areas on a web page or on two different web pages. The browser automation server 509 extracts the two HTML table cells that contain the address and library hour information and adds them to the response in step 813. FIG. 9 illustrates an example concatenation of relevant information extracted from web pages resulting from the execution of a synthesized sequence of web actions in response to a user request. The browser automation server 509 extracts and combines the library location cell 912 and operating hours cell 913 from web pages 910 and 911, respectively.

Figure 10:
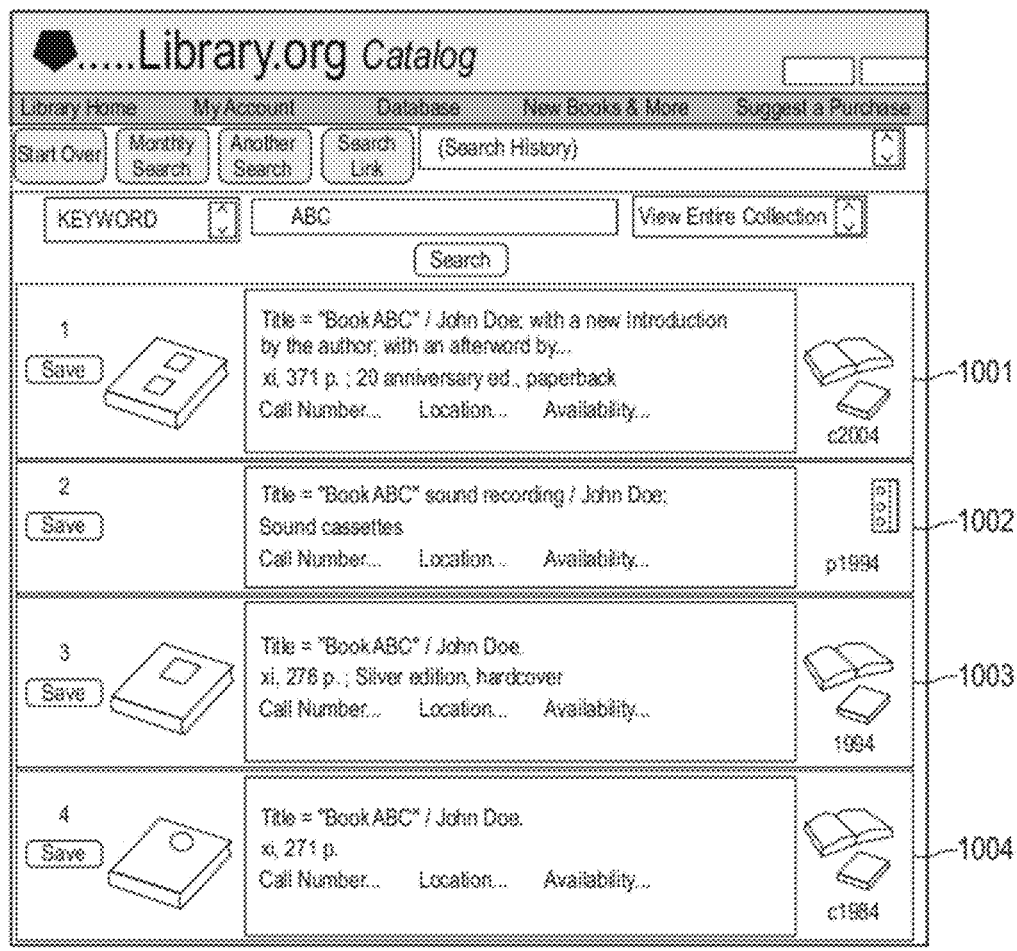
FIG. 10 illustrates an example of candidate regions on a web page as identified by a browser automation server using geometric clustering, according to an embodiment of the invention.

Explicit clip commands, however, are generally rare in script repositories since the user may not know in advance which pages contain the relevant information. The browser automation server 509 could provide an automatic clipping function, per step 812, as the information most relevant to a user response typically appears on the last web page visited during a script execution. To determine the region on a web page that has the most relevant information, the browser automation server 509 may incorporate geometric clustering to group together document objects into maximal regions (clusters). These regions form a candidate set of clips for this page. FIG. 10 illustrates an example of candidate regions 1001-1004 on a library's web pages as identified by a browser automation server using geometric clustering, according to an embodiment of the invention. The browser automation server 509 ranks the regions 1001-1004 relative to a query based on the user command.

For each of the regions 1001-1004, browser automation server 509 computes a "bag of words" in that region, compares it against the bag of words in the query, and scores each region using the relative size of the intersection between the bags of words. A region that contains exactly the words in the query may have a score of 1, a region that has no words in common with the query may have a score of 0. The output of the auto-clipping process is the region that has the highest score relative to the user's command. For example, in FIG. 10, the region 1004 is considered the best match for the command "search library for book "ABC". Although all four of the books in regions 1001-1004 on the web page match the query, the fourth book region 1004 is returned because it has the shortest title and therefore scores the highest on overlap with the query. If the automatic clipping algorithm fails to produce the desired result, a user always has the option of creating a script with explicit clip commands, to override the automatic mechanism.

For some scripts, the most relevant clip may not be on the final web page. One example is a script that logs out a user session after a user transaction. The browser automation server 509 may incrementally clip from each page encountered during execution of the script. For each page, it calculates a set of candidate regions and scores these regions relative to the text of the step that resulted in that page. For example, after executing the step "click the Library Hours link", the task automation system 503 identifies the region titled "Library Hours" on the resulting web page. It collects these intermediate clip regions as the script progresses, and at the end, combines these candidates with the clips identified on the final page.

The task automation system 503 scores the entire set of candidate clip regions against the original command text and returns the highest-scoring region. It returns the highest-ranked regions to be incorporated into the results. In the phone-forwarding example, the sequence of actions ends with a final "logout" step, so incremental auto-clip enables the system to report the forwarding status from an intermediate page during the script's execution. Once the task automation system 503 generates a response to the user task, it returns the response to the original transport or another transport specified by the user, at step 814.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. For example, audio, text, spreadsheets, and databases could be encapsulated with metadata. Such audio may include information on heart murmurs. Text could include patient medical records and financial. Spreadsheets and databases may include company or hospital-wide activities. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
   a message transport system to receive a user web task from a user device;
   a synthesizer to extract command information from the task, the extracted information including task parameters converted into a command, the command selected from the group consisting of: syntax and unstructured text in a core command;
   the synthesizer to identify a plurality of prior scripts related to the command and rank a relevance of the scripts relative to the task;
   the synthesizer to generate a sequence of web actions from a selection of ranked scripts into a combined script to automate and accomplish the task, wherein the sequence of web actions is based on prior user web actions;
   and
   a browser automation server to execute the synthesized sequence of web actions associated with the combined script, and returning to the user information that is relevant to the user web task, wherein the information results from said execution.

2. The system of claim 1, further comprising the synthesizer to receive an added parameter to one of the scripts.

3. The system of claim 1, further comprising the script execution returning two or more web pages of relevant information and the browser to combine parts of the returned pages into a response.

4. The system of claim 3, further comprising the combined script including a clip command to extract regions of interest from the returned pages.

5. The system of claim 4, further comprising a concatenated output of the extracted regions.

6. The system of claim 1, further comprising the combined script including an auto-clip command to rank document object clusters relative to the user task.

7. A computer program product comprising a computer readable non-transitory storage medium having computer readable program code embodied therewith, the computer readable program code comprising:
   computer readable program code configured to receive a user web task from a user device;
   computer readable program code to extract command information from the task, the extracted information including task parameters converted into a command, the command selected from the group consisting of: syntax and unstructured text in a core command;
   computer readable program code to identify a plurality of prior scripts related to the command and rank a relevance of the scripts relative to the task;
   computer readable program code configured to generate a sequence of web actions from a selection of ranked scripts into a combined script to automate and accomplish the task, wherein the sequence of actions is based on prior user web actions;
   computer readable program code configured to execute the synthesized sequence associated with the combined script; and
   computer readable program code configured to return to the user information that is relevant to the task, wherein the information results from said execution.

8. The computer program product of claim 7, further comprising computer readable program code configured to allow addition of parameter input to the synthesized sequence.

9. The computer program product of claim 7, further comprising computer readable program code configured to extract said information from a web page downloaded during said execution.

10. The computer program product of claim 9, wherein said information is extracted using an auto-clipping utility.

11. The computer program product of claim 7, wherein the task is specified through a message transport system.

12. The computer program product of claim 11, wherein the message transport system is selected from the group consisting of an email interface, a short message system (SMS) interface, and a portable computer interface.

13. The computer program product of claim 7, wherein the task is specified as a generally short textual message.

14. A method comprising:
   receiving a user web task from a user device;
   extracting command information from the user task, the extracted information including task parameters converted into a command, the command selected from the group consisting of syntax and unstructured text in a core command;
   identifying a plurality of prior scripts related to the command and rank a relevance of the scripts relative to the task;
   generating a sequence of web actions from a selection of ranked scripts into a combined script to automate and accomplish the task, wherein the sequence is based on prior web actions;
   executing the synthesized sequence associated with the combined script; and
   returning to the user, information that is relevant to the task, wherein the information results from said execution.

15. The method of claim 14, wherein the prior actions are derived from a browsing history.

16. The method of claim 14, further comprising adding parameter input to the synthesized sequence.

17. The method of claim 14, further comprising confirming the synthesized sequence of web actions through a user interface.

18. The method of claim 14, wherein said information is extracted from a web page downloaded during said execution.

19. The method of claim 18, wherein said information is extracted based on a clipping instruction.

20. The method of claim 18, wherein said information is extracted using an auto-clipping utility.

21. The method of claim 20, wherein the auto-clipping utility is based on geometric clustering and generates a web page region with a highest relevancy score relative to the task.

22. The method of claim 14, wherein the synthesized sequence is processed by a browser automation server.

23. The method of claim 14, wherein the task is specified through a message transport system.

24. The method of claim 23, wherein the message transport system is selected from the group consisting of an email interface, a short message system (SMS) interface, and a portable computer interface.

25. The method of claim 14, wherein the user web task is specified in a generally short textual format.

\* \* \* \* \*